United States Patent [19]

Itoh

[11] Patent Number: 4,841,208
[45] Date of Patent: Jun. 20, 1989

[54] POSITION CONTROL SYSTEM INCLUDING A QUICK RESPONSE CONTROL

[75] Inventor: Hiroshi Itoh, Numazu, Japan

[73] Assignee: Toshiba Kikai Kabushi Kaisha, Tokyo, Japan

[21] Appl. No.: 95,110

[22] Filed: Sep. 11, 1987

[30] Foreign Application Priority Data

Sep. 11, 1986 [JP] Japan .................................. 61-214741
Apr. 7, 1987 [JP] Japan .................................. 62-86649

[51] Int. Cl.$^4$ ...................... G05B 13/02; B29C 47/92
[52] U.S. Cl. .................................... 318/561; 364/148; 364/174; 425/145; 264/40.7
[58] Field of Search ....................... 318/561, 567, 636; 364/148, 152, 174, 194; 264/40.5, 40.7; 425/135, 139, 145

[56] References Cited

U.S. PATENT DOCUMENTS

| | | | |
|---|---|---|---|
| 3,859,400 | 1/1975 | Ma ...................................... | 264/40.5 |
| 3,893,792 | 7/1975 | Laczko ........................... | 264/40.5 X |
| 3,936,713 | 2/1976 | Hunkar ................................. | 318/573 |
| 3,941,534 | 3/1976 | Hunkar ........................... | 264/40.7 X |
| 3,977,255 | 8/1976 | Groleau et al. ................ | 364/476 X |
| 4,161,380 | 7/1979 | Bishop .................................. | 425/145 |
| 4,190,220 | 2/1980 | Hahn et al. ..................... | 364/426 X |
| 4,734,869 | 3/1988 | Mickowski ................... | 264/40.7 X |

Primary Examiner—Bentsu Ro
Attorney, Agent, or Firm—Birch, Stewart, Kolasch & Birch

[57] ABSTRACT

A position control system comprises a position command generator for generating a position command at a prescribed sampling time k for a time k+M which is at least one sampling cycle M ahead of the prescribed sampling time. A controlled object includes a speed control loop, and a control unit for generating a control input value determined by determining a weight coefficient of each of position commands at sampling times K+l (l=1, 2, . . . , M) and a weight coefficient for the position and speed which are outputs of the controlled object in order to minimize the value of an evaluation function so that the position command at the prescribed sampling time k and the position of the controlled object will be equalized, while the position commands produced by the position command generator at the sampling times k+l (l=1, 2, . . . , M), the position and speed of the controlled object, and a control input to be applied to the controlled object are being used as variables.

4 Claims, 9 Drawing Sheets

FIG.1

PRIOR ART

MAX(Y1) 20.00677 position(mm)
MAX(X1) 19.99663 position(mm)
MAX(Y2) 0.2004423 velocity(m/sec)
MAX(X2) 0.1892605 velocity(m/sec)
MAX(Y3) 0.005765 acceleration(m/sec$^2$)
MAX(X3) 0.005764 acceleration(m/sec$^2$)

POSITION CONTROL SYSTEM INCLUDING A QUICK RESPONSE CONTROL

BACKGROUND OF THE INVENTION

1. Field of the Invention

The present invention relates to a position control system for use with a machine tool or the like, and more particularly to a position control system having a position control loop with improved quick response capability as well as stability maintained at a desired level.

2. Description of Background Art

Figure 1:
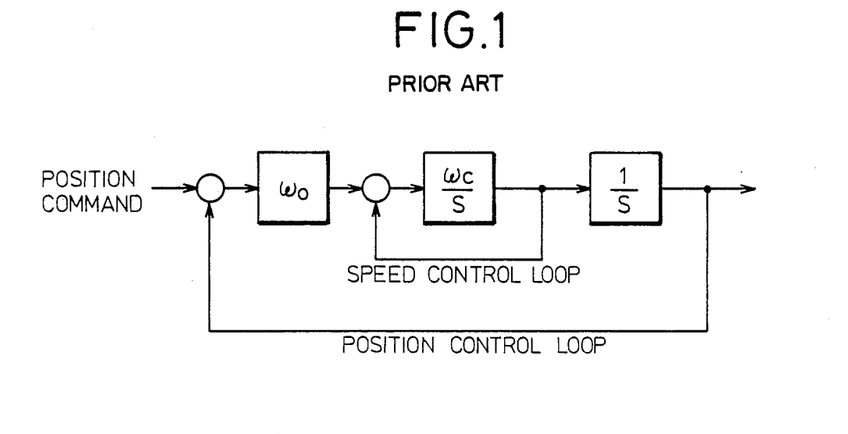
FIG. 1 is a block diagram of a conventional position control system (software-implemented servo system)

FIG. 1 of the accompanying drawings illustrates a software-implemented servo system which has widely been used heretofore as a position control system for use with a machine tool or the like.

The illustrated position control system comprises a position control loop having a relatively low gain $\omega_0$ with respect to a position command and a speed control loop having a relatively high gain $\omega_c$ with respect to the position command.

Because the speed control loop of this position control system has a high gain $\omega_c$, the position control system is less susceptible to disturbances and parameter changes. Furthermore, since the position control loop has a low gain $\omega_c$, the mechanical system is not subject to excessive shock (acceleration), and hence no special care is required in preparing a machining program for an NC machine tool or the like.

However, the position control system of the type described above has the following problems:

Inasmuch as the maximum value of the gain $\omega_0$ of the position control loop is limited by the allowable maximum acceleration and maximum speed of the mechanical system, the response time cannot be increased beyond the maximum values. Since the control positional accuracy is limited by the maximum value of the gain $\omega_0$ of the positional control loop, the positional accuracy cannot be increased beyond the maximum gain.

The above problems are of great importance in modern positional control which requires high accuracy. The positional control loop of the conventional positional control system shown in FIG. 1 has a characteristic $G_{(s)}$ with respect to a position command, and such a characteristic $G(s)$ can be approximated in a software-implemented servo system with a time lag of first order as:

$$G_{(s)} = \frac{\omega_0}{S + \omega_0} \quad (1)$$

Since a response characteristic $V_{(t)}$ of the speed with respect to a stepwise speed command ($V_0/S$) is given by:

$$V_{(t)} = V_0(1 - e^P) \quad (2)$$

where P is $-\omega_0 t$, the acceleration $a_{(t)}$ *required is determined by differentiating the equation* (2) through first-order differentiation as:

$$a_{(t)} = V_0 \cdot \omega_0 \cdot e^P \quad (3)$$

Therefore, assuming that the maximum speed of the mechanical speed is $V_{O\ max}$, the maximum acceleration $a_{max}$ generated by the positional control system is limited by:

$$a_{max} = V_{O\ max} \cdot \omega_O \quad (4)$$

As the allowable maximum acceleration $A_{max}$ of the mechanical system is determined by its structure, the maximum acceleration $a_{max}$ and the allowable maximum acceleration $A_{max}$ should meet the following relationship:

$$a_{max} \leq A_{max}$$

Therefore, the maximum value $V_{0\ max}$ of the gain of the position control loop is limited by:

$$\omega_{O\ max} = A_{max}/V_{0\ max} \quad (5)$$

The problem of quick response will be described with reference to an injection molding machine by way of example.

Figure 2:
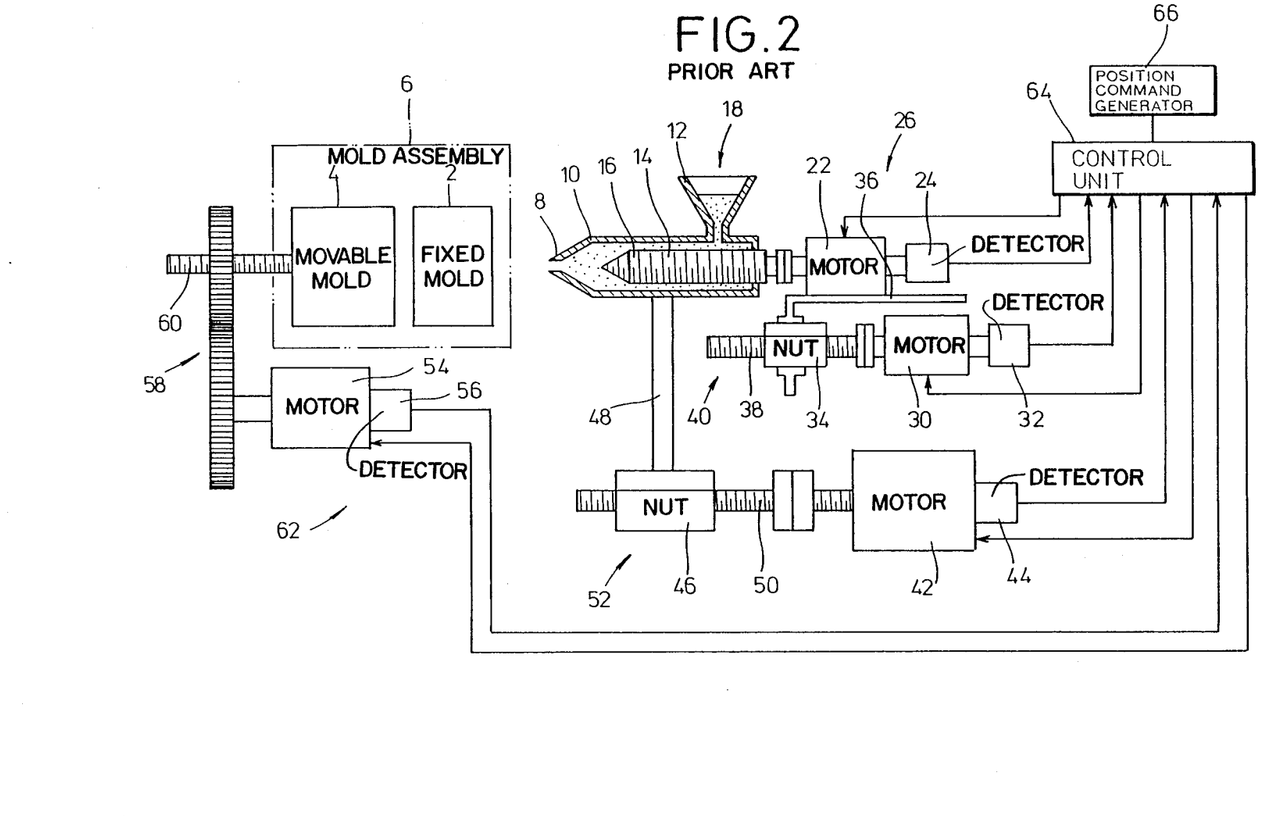
FIG. 2 is a schematic view, partly in block form, of an injection molding machine.

As shown in FIG. 2 of the accompanying drawings, a conventional injection molding machine includes: a mold assembly 6 composed of a fixed mold 2 and a movable mold 4. A metering injection unit 18 is composed of a cylinder 10 having a nozzle 8 on its tip end. A hopper 12 is provided for supplying a synthetic resin material, and a piston 16 disposed in the cylinder 10 and having a metering and supplying screw 14. A metering actuator 26 includes a motor 22 for rotating the piston 16 in the cylinder 10 and a detector 24. An injecting actuator 40 is provided including a motor 30 for moving the piston 16 as well as the metering actuator 26 back and forth with respect to the cylinder 10. A detector 32, a nut member 34, a support 36, and a ball screw 38 are operatively mounted relative to each other. A cylinder actuator 52 includes a motor 42 for moving the cylinder 10 toward and away from the mold 6. A detector 44, a nut member 46, a connecting member 48, and a ball screw 50 are operatively mounted relative to each other. A mold actuator 62 includes a motor 54 for moving the movable mold 4 toward and away from the fixed mold 2. A detector 56, a gear train 58, and a ball screw 60 are operatively mounted relative to each other. A control unit 64 is provided for applying control signals to the actuators 26, 40, 52, and 62; and a position command generator 66. The actuators 26, 40, 52, and 62 and the control unit 64 jointly constitute a control system which is a software-implemented servo system as shown in FIG. 1.

When position commands for the respective actuators 26, 40, 52, and 62 are applied from the position command generator 66 to the control unit 64 according to a predetermined program, the mold actuator 62 moves the movable mold 4 toward the fixed mold 2 to form a mold cavity (not shown) for being filled with the synthetic resin material. In addition, the cylinder actuator 52 moves the cylinder 10 to position the nozzle 8 in the injection port (not shown) of the fixed mold 3. The metering actuator 26 is operated in advance to rotate the piston 16 for metering the synthetic resin material supplied from the hopper 12. Further, the injecting actuator 40 is operated to move the piston 16 in the cylinder 10 to inject the synthetic resin material from the cylinder 10 through the nozzle 8 into the mold cavity for thereby molding a desired article within the mold assembly 6.

The quality of the molded article is dependent on the manner in which the synthetic resin material is injected from the metering injection unit 18 into the mold cavity of the mold assembly 6. The manner in which the synthetic resin material is injected is inturn limited by various conditions such as the inner shape of the mold cavity, the kind of the synthetic resin material, the temperature, the design of the metering injection unit 18, and the like. Desired molded products cannot be obtained simply by injecting the synthetic resin material in a single operation. The position control system for the injecting actuator 40 is required to be better in quick response while maintaining stability as compared to a position control system for other actuators. However, such a requirement cannot be met by the above software-implemented servo system.

Since the quick response is thus limited by the mechanical system in the injection molding machine employing the conventional position control system, it has been not possible to control the injecting actuator 40 to carry out the resin injection process under ideal conditions based on a complex position-time diagram (not shown). Further it has been difficult to fabricate high-quality products.

Two-axis control of an X-Y plotter, for example) for drawing a circle will be described in relation to the accuracy problem.

If the accuracy of drawing a circle is expressed by a radius reduction ratio $\delta$, the radius reduction ratio can be given by:

$$\delta = \frac{\Delta R}{R} \left\{ 1 + \left[ \frac{V_0}{2\pi R \omega_0} \right] \right\}^{-\frac{1}{2}} - 1 \qquad (6)$$

$$\approx \frac{1}{2} \left[ \frac{V_0}{2\pi R \omega_0} \right]^2$$

where R is the radius (mm) of a commanded circle, $\Delta R$ is the amount (mm) by which the radius is reduced, and $V_0$ is the speed (mm/min.).

When drawing a circle having the constant radius R at the constant speed $V_0$ as indicated by the equation (6), the radius reduction ratio $\delta$ is proportional to $1/\omega_0^2$ (i.e., inversely proportional to $\omega_0^2$). The maximum gain $\omega_0$ max of the position control loop is limited in relation to the mechanical system as shown by the equation (5) above. Therefore, since the upper limit of the maximum gain $\omega_0$ max is determined by the allowable maximum accleration $A_{max}$ and the maximum speed $V_0$ max which are determined by the mechanical system in the position control system that is approximated by the equation (1), if the mechanical system ($A_{max}$, $V_0$ max) is fixed, then the upper limit of the maximum gain $\omega_0$ max is restricted and cannot be increased. As a result, the accuracy ($\delta$) is limited by the maximum gain $\omega_0$ max, and cannot be increased.

SUMMARY OF THE INVENTION

It is a general object of the present invention to provide a position control system capable of increasing the quick response while maintaining the stability of a position control loop for thereby increasing the controllability of a machine tool or the like which is controlled by the position control system.

Another object of the present invention is to provide a position control system comprising position command generating means for generating a position command at a prescribed sampling time k for a time k+M which is at least one sampling cycle M ahead of the prescribed sampling time, a controlled object including a speed control loop, and control means for generating a control input value determined by determining a weight coefficient of each of the position commands at sampling times k+l (l=1, 2, ..., M) and a weight coefficient for the position and speed which are outputs of the controlled object in order to minimize the value of an evaluation function so that the position command at said prescribed sampling time k and the position of the controlled object will be equalized, while the position commands produced by said position command generating means at the sampling times k+l (l=1, 2, ..., M), the position and speed of the controlled object, and a control input to be applied to said controlled object are being used as variables.

Still another object of the present invention is to provide a position control system wherein the state equation of said controlled object in a discrete-time system is expressed by:

$$X_{(k+1)} = \Phi \cdot X_{(k)} + G \cdot U_{(k)},$$

and a control input vector for minimizing the evaluation function:

$$\begin{aligned}
J_{c(k)} = \ & [R_{0(k+m)} - X_{(k+M)}]^T \cdot \\
& F_M \cdot [R_{0(k+M)} - X_{(k+M)}] + \\
& \sum_{j=k}^{k+M} \{[R_{0(j)} - X_{(j)}]^T \cdot \\
& Q \cdot [R_{0(j)} - X_{(j)}] + \\
& U_{(j-1)}^T \cdot H_{(j-i-k)} \cdot U_{(j-i)}\}
\end{aligned}$$

which evaluates the difference between a status variable vector $X_{(k)}$ of said controlled object and a position command vector $R_{0(k)}$ is generated at the prescribed sampling time k, while the position command vectors $R_{0(k+1)}$, $R_{0(k+2)}$, ..., $R_{0(k+M)}$ generated by said position command generating means from a sampling time k+1 to a sampling time k+M which is M steps ahead of the sampling time k+1 are being used as variables, where $X_{(k)}$: the status variable vector (n×i) of the system,
$\Phi$: the coefficient matrix (n×n) of the controlled object,
G: the input matrix (n×m),
$U_{(k)}$: the control input vector (m×i),
$R_{0(k)}$: the enlarged position command signal (n×1),
$F_M$: the final matrix (n×n),
Q: the positive semi-definite symmetric matrix (n×n),
$H_{(i)}$: the positive definite symmetric matrix (m×m),
i=1, ..., M (M is a predictive period, i.e., the number of sampling times).

Yet another object of the present invention is to provide a position control system wherein the matrix H representing a weight coefficient with respect to the control input vector $U_{(k)}$ is determined as a function of time, and a function which is of a value that is smaller as the sampling time transpires is determined as:

$$H_{(i)} = H_0 + (H - H_0)e^{-Ci} (i=1, 2, \ldots, M)$$

where $H_0$, H, C are constants.

A still further object of the present invention is to provide a position control system wherein said controlled object comprises an injection molding machine including a mold assembly having a mold cavity, and resin injecting means actuatable for injecting a synthetic resin material into said mold cavity in response to the control input produced by said control means.

The above and other said objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 3:
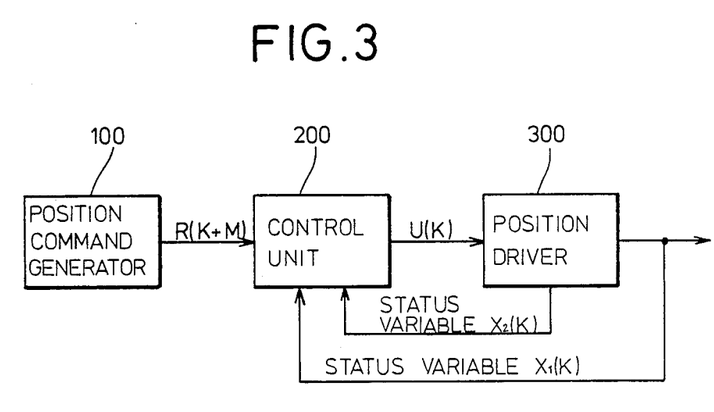
FIG. 3 is a block diagram of a position control system according to the present invention.

FIG. 3 shows a position control system comprising a position command generator 100, a control unit 200, and a position driver 300. The state equation in a continuous-time system of the position driver 300 is expressed by the following differential equation:

$$\dot{X} = aX + bU$$

where $$X = \begin{bmatrix} X_1 \\ X_2 \end{bmatrix}, a = \begin{bmatrix} 0 & \omega_0 \\ 0 & -\omega_c \end{bmatrix}$$

$$a = \begin{bmatrix} 0 \\ \omega_c \end{bmatrix}, U = u$$

If the state equation given above is expressed by a discrete-time system with a sampling period T, the status variable vector $X_{(k+1)}$ of the system of the position driver 300 is expressed by:

$$X_{(k+1)} = \Phi \cdot X_{(k)} + G \cdot U_{(k)} \quad (7)$$

where $\Phi$: the coefficient matrix (n×n) of the controlled object, and $$\Phi = \begin{bmatrix} 1 & \left(\dfrac{\omega_0}{\omega_c}\right)(1-e^P) \\ 0 & e^E \end{bmatrix}$$

where $P = -\omega_0 T$, $E = -\omega_0 T$, $\omega_0$: the gain of the position control loop of the position driver, $\omega_c$: the gain of the speed control loop of the position driver, G: the input matrix (n×m), $$G = \begin{bmatrix} \omega_0 T - 1 + e^P \\ 1 - e^E \end{bmatrix}$$

$U_{(k)}$: the control input vector (m×i).

The evaluation function $J_{c(k)}$ is determined by the equation (8):

$$\begin{aligned} J_{c(k)} = &\ [R_{0(k+m)} - X_{(k+M)}]^T \cdot \\ & F_M \cdot [R_{0(k+M)} - X_{(k+M)}] + \\ & \sum_{j=k}^{k+M} \{[R_{0(j)} - X_{(j)}]^T \cdot \\ & Q \cdot [R_{0(j)} - X_{(j)}] + \\ & U_{(j-1)}^T \cdot H_{(j-i-k)} \cdot U_{(j-1)}\} \end{aligned} \quad (8)$$

where $$R_{0(k)}: \begin{bmatrix} R(k) \\ 0 \end{bmatrix} (n \times 1),$$

$F_M$: the final matrix (n×n),

Q: the positive semi-definite symmetric matrix (n×n) which is a weight function, M: the predictive period, i.e., the number of sampling times, $H_{(i)}$: the positive definite symmetric matrix (m×m) which is a weight function.

According to a feature of the present invention, the weight coefficient $H_{(i)}$ is not a fixed constant, but a variable which is expressed by:

$$H_{(i)} = H_0 + (H - H_0)e^{-Z \cdot i} \quad (9)$$

i = 1, 2, ..., M

Z = a constant, so as to be quickly responsive to the status of the system.

Therefore, the evaluation function $J_{c(k)}$ of the quadratic nature given by the equation (8) can be expressed with respect to the status variable vector $X_{(k+1)}$ of the system expressed by the equation (7), as follows, using the optimum control theory:

$$U_{(k)} = -B_{(M)} \cdot G^T \cdot [S_{(M-1)} \cdot \Phi \cdot X_{(k)} - C^T \cdot Q \cdot R_{(K+1)} + (-\tfrac{1}{2})\theta^T_{(M-1)}] \quad (10)$$

$S_{(M-L)}$, $B_{(M-L)}$, $\theta_{(M-L)}$ are M constant matrixes corresponding to L = 1, 2, 3, ... M, and are of the following magnitudes:

$$S_{(M-L)} = \Phi^T \cdot S_{(M-L-1)}[I - G \cdot B_{(M-L)} \cdot G^T \cdot S_{(M-L-1)}]\Phi + C^T \cdot Q \cdot C \quad (n \times n)$$

$$B_{(M-L)} = [G \cdot S_{(M-L-1)} \cdot G + H_{(M-L)}]^{-1} \quad (m \times m)$$

$$\theta_{(M-L)} = [2R^T_{k+L+1} \cdot Q \cdot C - \theta_{(M-L-1)}][G \cdot B_{(M-L)} \cdot G^T \cdot S_{(M-L-1)} - I] \Phi \quad (n \times 1)$$

where I, C are constants.
The boundary conditions are $$S_{(0)} = C^T(F_M + Q) + C$$

$$\theta^T_{(0)} = -2R^T_{(k+M)} \cdot F_M \cdot C$$

$F_M$ is the convergent value of $S_{(M-L)}$ when $S_{(0)}$ and $\theta_{(0)} = 0$ and $M - L \to \infty$.

By putting the equations (7) and (9) in the equation (10) (including up to the boundary conditions), the control input vector $U_{(k)}$ is determined as $$U_{(k)} = f_1 \cdot X_{1(k)} + f_2 \cdot X_{2(k)} + g_{(k)} \quad (11)$$

where $f_1$, $f_2$ are constants.

Figure 4:
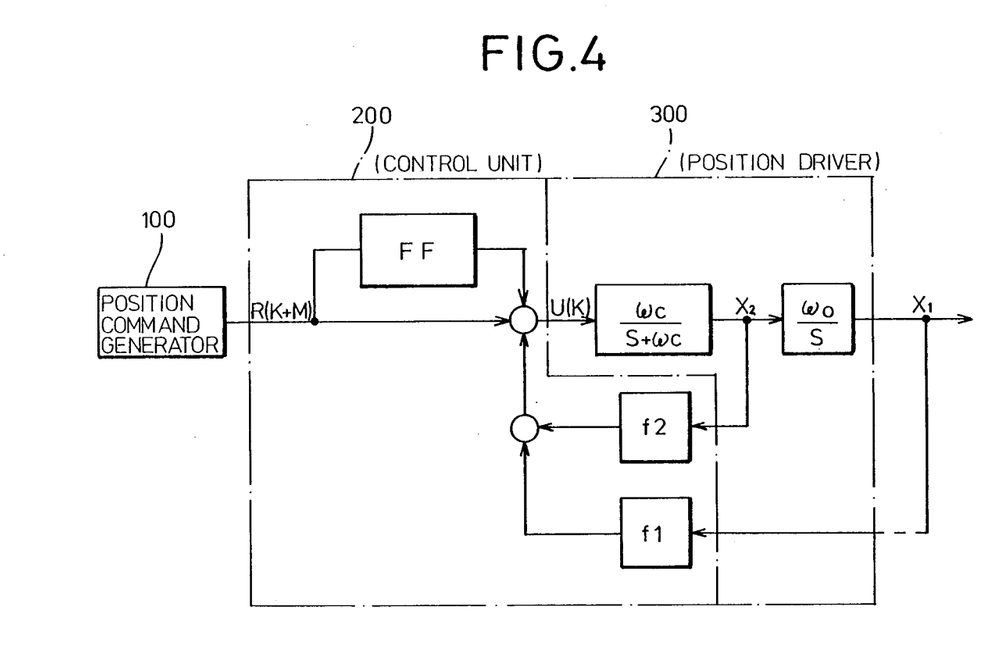
FIG. 4 is a detailed block diagram of the position control system shown in FIG. 3.

In order to control the position control system having the characteristics of the control system expressed by the equation (7) so that the evaluation function $J_{c(k)}$ given by equation (8) will be minimized, the equation (11) should be executed, e.g., by constructing a control loop shown in FIG. 4.

For a fuller understanding of the present invention, positional control effected by using a computer will be described in detail below. In the equation (10), $B_{(M)}$, $G$, $S_{(M-1)}$, $\Phi$, $C$, $Q$ are constants and need not be calculated in each sampling cycle, but $X_{(k)}$, $R_{(k)}$ are variables that vary in each sampling cycle, and $\theta_{(M-1)}$ is a value that is calculated from the value of a position commands ranging from $R_{(k+2)}$ to $R_{(k+M)}$. Therefore, it is necessary to calculate $X_{(k)}$, $R_{(k)}$, $\theta_{(M-1)}$ in each sampling cycle.

$\theta_{(M-1)}$ is determined from the equation (10) based on the following general equations:

$$A_{(M-1)} = [I - G \cdot B_{(M-L)} \cdot G \cdot S_{(M-L-1)}] \Phi \quad (12)$$

$$\theta_{(M-L)} = [\theta_{(M-L-1)} - 2R^T_{(k+L+1)} \cdot Q \cdot C] A_{(M-L)} \quad (13)$$

where $L = 1, 2, \ldots, M-1$.

Thus, the following equations are obtained from the equation (13):

$$\theta_{(1)} = [\theta_{(0)} - 2R^T_{(K+M)} \cdot Q \cdot C] A_{(1)}$$

$$\theta_{(2)} = [\theta_{(1)} - 2R^T_{(K+M-1)} \cdot Q \cdot C] A_{(2)}$$

$$\theta_{(3)} = [\theta_{(2)} - 2R^T_{(K+M-2)} \cdot Q \cdot C] A_{(3)}$$

$$\theta_{(M-2)} = [\theta_{(M-3)} - 2R^T_{(K+3)} \cdot Q \cdot C] A_{(M-2)}$$

$$\theta_{(M-1)} = [\theta_{(M-2)} - 2R^T_{(K+2)} \cdot Q \cdot C] A_{(M-1)}$$

Figure 5:
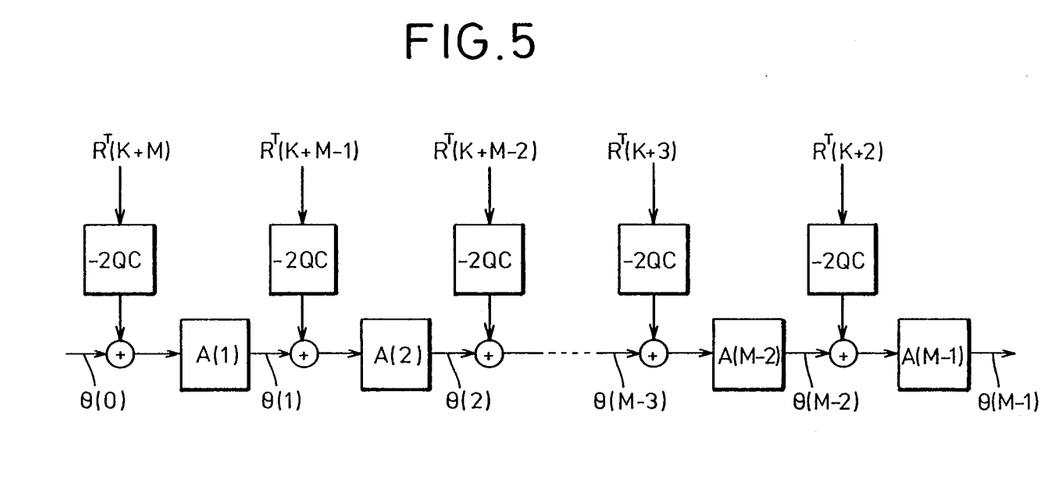
FIG. 5 is a block diagram of a processor for effecting feed forward operation.

$A_{(M-L)}$ is calculated in advance using $S_{(M-L)}$, $B_{(M-L)}$. The feed forward arrangement FF shown in FIG. 4 may be constructed as shown in FIG. 5.

Figure 6:
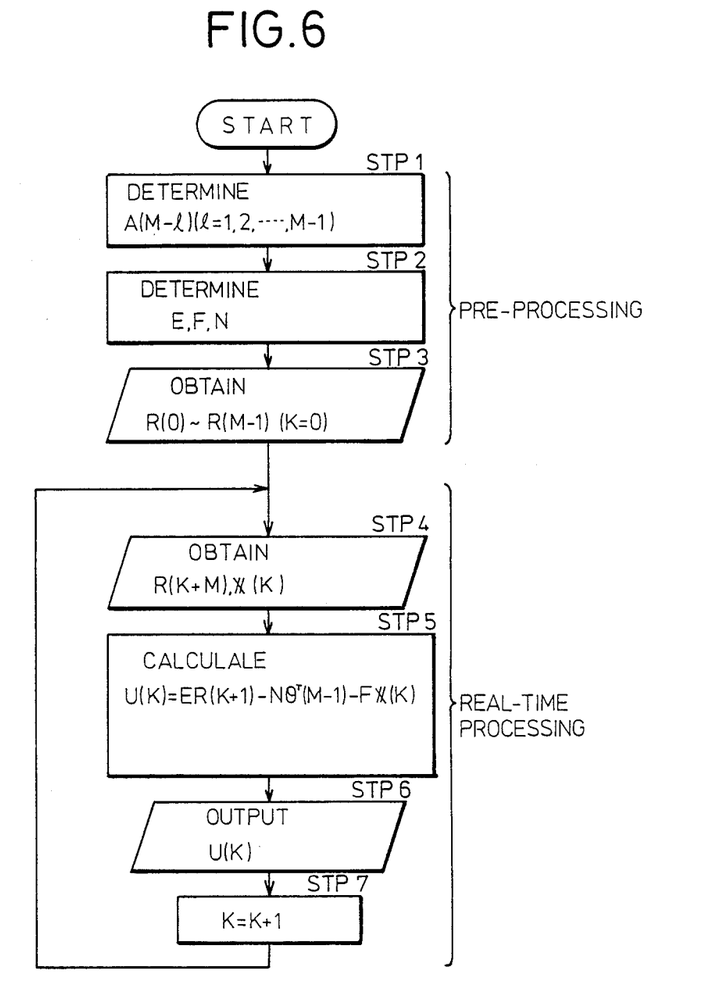
FIG. 6 is a flowchart of a sequence for determining a control input vector $U_{(k)}$ to be applied to an object to be controlled.

Since the equation (10) can be rewritten as:

$$U_{(k)} = E \cdot R_{(k+1)} - N \cdot \theta^T_{(M-1)} \cdot F \cdot X_{(k)} \quad (14)$$

where
$E = B_{(M)} \cdot G^T \cdot C^T \cdot Q$,
$F = B_{(M)} \cdot G^T \cdot C^T \cdot S_{(M-1)} \cdot \Phi$,
$N = (\frac{1}{2}) B_{(M)} \cdot G^T$, the processing of the sampled-value control system using the computer may be executed based on the equation (14) according to a sequence shown in FIG. 6.

More specifically, in a pre-processing procedure prior to real-time processing procedure, E, F, N, $A_{(n=1, 2, \ldots, M-1)}$ are determined in steps 1 and 2, and $R_{(0)}$ through $R_{(M-1)}$ are obtained from the position command generator 100 in a step 3. Then, $R_{(k+M)}$, $X_{(k)}$ are otained in a step 4 in the read-time processing. Thereafter, $\theta^T_{(M-1)}$ is determined form $R_{(k+2)} \ldots R_{(k+M)}$ and $A_{(1)} \ldots A_{(M-1)}$, and $U_{(k)}$ is determined from E, F, $R_{(k+1)}$, $X_{(k)}$ in a step 5. $U_{(k)}$ is then output to the position driver 300. The above process is repeated.

EXAMPLE 1

The position command generator 100, the control unit 200, the position driver 300 as shown in FIG. 3 are employed respectively as the position command generator 66, the control unit 64, and the injecting actuator 40 as illustrated in FIG. 2. Therefore, the example 1 is arranged such that in the injection molding machine having the injection driver 40 for actuating the piston 16 to inject the synthetic resin material from the cylinder 10 into the mold assembly, and the control unit 64 for controlling the injecting actuator 40 in response to a signal from the position command generator 66, the control unit 64 is supplied with a position command signal $R_{(k+L)}$ (L=1, 2, ..., M) from the position command generator 66, and the control input signal $U_{(k)}$ which is determined in order to minimize the evaluation function $J_{c(k)}$ with a status variable $X_{(k)}$ determined by the relationship between the piston 16 and the cylinder 10 being defined as a feedback signal is output to the injecting actuator 40 for achieving predictive control.

Figure 7:
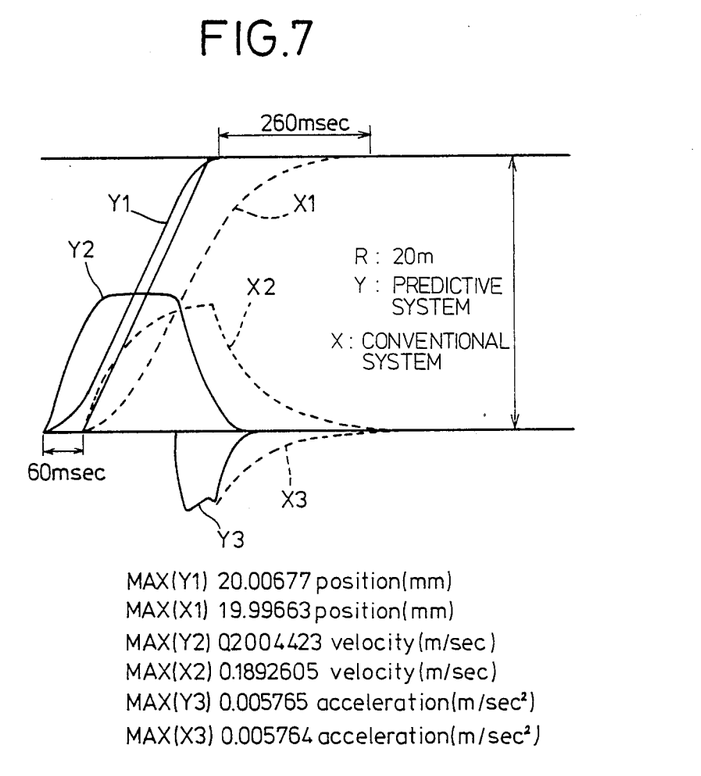
FIG. 7 is a timing chart showing the results obtained by the present invention.

FIG. 7 shows the response of the injecting actuator 40 according to the example 1 in which the mechanical system is the same as that of the conventional injecting molding machine shown in FIG. 2, the control unit 64 is in the form of a computer as shown in FIG. 4, and a stepwise position command (R = 20 mm) is applied as an input signal from the position command generator 66 to the control unit 64.

In FIG. 7, the maximum value of acceleration ($Y_3$) of the predictive system is substantially the same as the maximum value of acceleration ($X_3$) of the conventional system even if the same ramp position command signal is applied. However, while the response of the predictive system ($Y_1$) with to the position command signal R is controlled substantially in synchronism with (more specifically, prior to) the signal R, a time delay which finally reaches about 260 msec. is produced in the conventional system ($X_1$). It will be understood that the quick response of the system of the invention is better than that of the conventional system. Such a result is based on the fact that the response of the system of the invention can be controlled about 60 msec. prior to the position command signal in an initial period, and the weight function $H_{(k)}$ is quickly varied in an intermediate period as a linear pattern. Although the maximum value in relation to the speed ($Y_2$, $X_2$) remains unchanged, a time delay is developed.

According to the example 1, as described above, the response of the system of the present invention is highly controlled quickly and in synchronism, and stability can be assured for making the maximum acceleration ($Y_3$, $X_3$) unvariable, unlike the conventional system in which the response is subject to a large time delay.

The conditions for the example 1 are as follows:
Sampling time T = 0.002 sec.,
Predictive period M = 30 times,
Gain $\omega_0$ of the position control loop = 20 rad/S, Gain $\omega_c$ of the speed control loop = 120 rad/S,
Weight coefficient H = 2000, H$_0$ = 0.2,
Constant Z = 0.3.

The gain $\omega_1$ of the conventional system is 14.41 rad/S.

According to the example 1, as described above, the weight function H$_{(k)}$ of the evaluation function J$_{c(k)}$ as defined by the equation (8) is a variable which can vary quickly dependent on the conditions of the system, so that the quick response can be greatly improved as compared with that of the conventional system. The acceleration of the predictive system according to the present invention may be 1/2.6 or less.

Since the ability of the speed of movement and position of the piston 16 to follow the position command can be increased even if the allowable maximum acceleration and maximum feed speed which determine the maximum value of the position control loop gain are limited in the same mechanical system as the mechanical system of the conventional injecting actuator 40, a high-quality injection-molded product can be manufactured while controlling the injecting actuator 40 according to a desired position-time diagram (not shown).

The injecting actuator 40 may be controlled at high speed without modifying the mechanical system and also without producing excessive acceleration (shock). Therefore, the existing mechanical system can easily be employed, a practical advantage in the industry.

While the portion of the control unit 64 corresponding to the injecting actuator 40 has predictive control characteristics in the example 1, those portions of the control unit 64 which correspond to the metering actuator 26, the cylinder actuator 52, and the mold actuator 62 may also have predictive control characteristics.

EXAMPLE 2

A circle is drawn on a flat plane in the position control system shown in FIGS. 3 and 4. As with the example 1, the response and accuracy are indicated when a ramp position (radius) command (R = 10 mm) is applied as an input signal.

Figure 8:
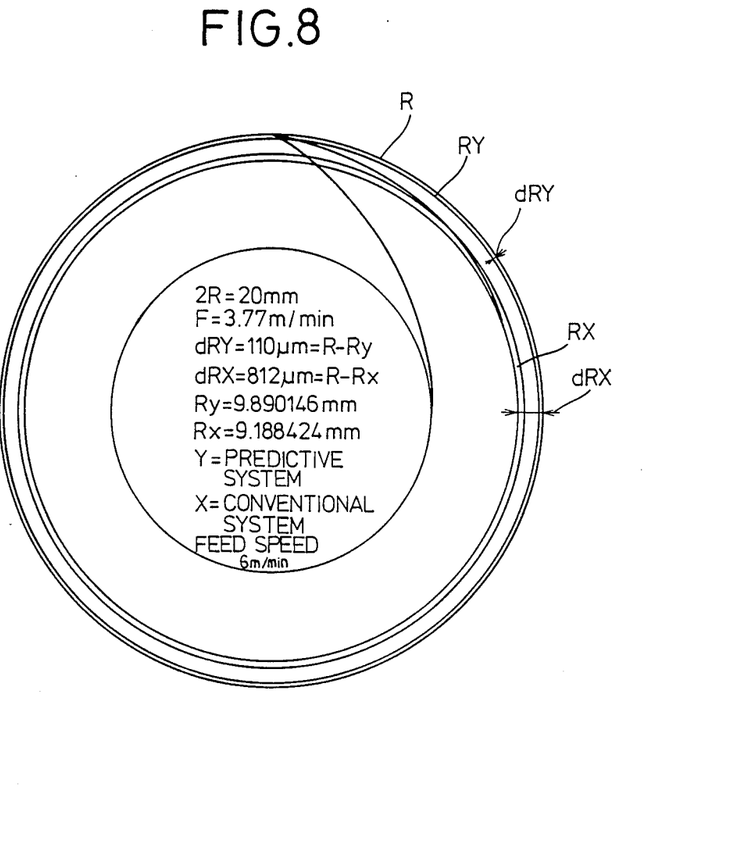
FIG. 8 is a diagram showing a circle drawn by an example of the present invention.

Comparison between the predictive position control system of the present invention and the conventional position control system indicates, as with the example 1, that, as shown in FIG. 8 (dRx, dRy are scaled 5 times for drawing convenience), the shape accuracy dRy (=R−Ry) is 110 micrometers with the predictive system, whereas the shape accuracy dRx (=R−Rx) is 814 micrometers with the conventional system. It is confirmed that a large increase in the accuracy is achieved by the example 2. The maximum accelerations of both systems are substantially the same as with the example 1.

The conditions for the example 2, i.e., T, M, $\omega_0$, $\omega_c$, H, H$_0$, Z, and $\omega_1$, are the same as those for the example 1. The wave form (sin) frequency for obtaining synchronism in drawing the circle is 1 Hz.

EXAMPLE 3

Figure 9:
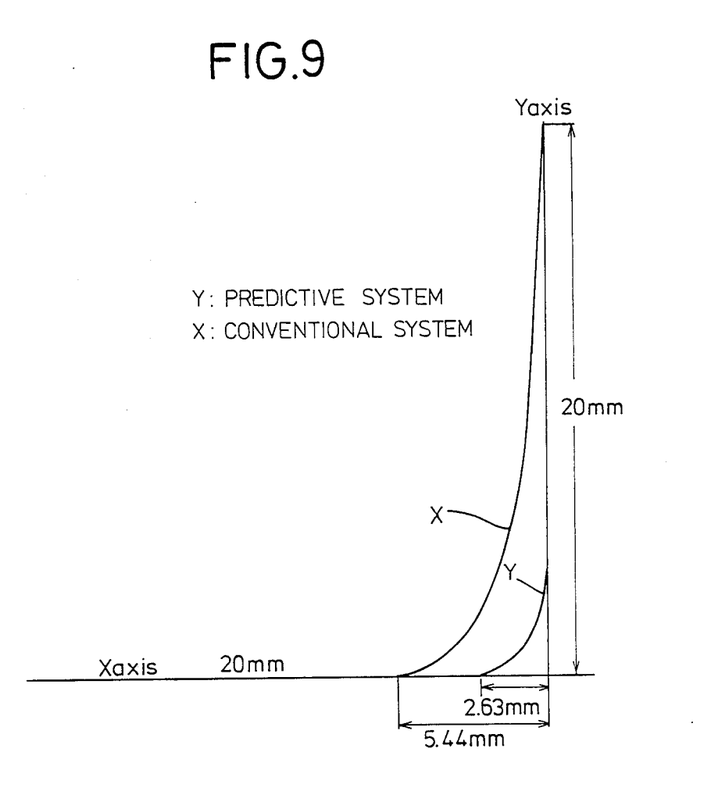
FIG. 9 is a diagram showing a corner drawn by another example of the present invention.

In this example, a corner is drawn at a speed of 6 m/min. As illustrated in FIG. 9, a corner drawn by the predictive system is deviated 2.63 mm from an orthogonal corner in the X-axis direction with respect to a Y-axis length (20 mm), and a corner drawn by the conventional system is deviated 5.44 mm from the orthogonal corner in the X-axis direction with respect to the Y-axis length (20 mm). Therefore, the accuracy of the predictive system is much larger.

The conditions for the example 3, i.e., T, M, $\omega_0$, $\omega_c$, H, H$_0$, Z, and $\omega_1$, are the same as those for the examples 1 and 2.

With the examples 2 and 3, as described above, since a shape accuracy higher than that which is determined by the maximum value of the position control loop gain can be achieved even if the allowable maximum acceleration and maximum feed speed which determine the maximum value of the position control loop gain are limited in the same mechanical system as the conventional mechanical system, a high accuracy and high-speed machining can be assured without modifying the mechanical system in any manner. The system of the invention is practically advantageous in that the existing mechanical system can be used. The stability of the position control loop is maintained.

According to the present invention, therefore, the quick response can be improved while maintaining the stability of the position control loop at a desired level, i.e., without modifying the conventional mechanical system, and high-quality and high-accuracy machining is rendered possible.

Although a certain preferred embodiment has been shown and described, it should be understood that many changes and modifications may be made therein without departing from the scope of the appended claims.

What is claimed is:

1. A position control system comprising:
   position command generating means for generating a position command at a prescribed sampling time k for a time k+M which is at least one sampling cycle M ahead of the prescribed sampling time;
   a controlled object including a speed control loop, and control means for generating a control input value determined by determining a weight coefficient of each of position commands at sampling times k+l, (l=1, 2, ..., M) and a weight coefficient for the position and speed which are outputs of the controlled object in order to minimize the value of an evaluation function so that the position command at said prescribed sampling time k and the position of the controlled object will be equalized, while the position commands produced by said position command generating means at the sampling times k+l (l=1, 2, ... M), the position and speed of the controlled object, and a control input to be applied to said controlled object are being used as variables, wherein the state equation of said controlled object in a discrete-time system is expressed by:

$$X_{(k+1)} = \Phi \cdot X_{(k)} + G \cdot U_{(k)},$$

and a control input vector for minimizing the evaluation function:

$$J_{c(k)} = [R_{0(k+M)} - X_{(k+M)}]^T \cdot F_M \cdot [R_{0(k+M)} - X_{(k+M)}] + \sum_{j=k}^{K+M} \{[R_{0(j)} - X_{(j)}]^T \cdot Q[R_{0(j)} - X_{(j)}] + U_{(j-1)}^T \cdot H_{(j-i-k)} \cdot U_{(j-i)}\}$$

which evaluates the difference between a status variable vector X$_{(k)}$ of said controlled object and a position command vector R$_{0(k)}$ is generated at the prescribed sampling time k, while the position command vectors R$_{0(k+1)}$, R$_{0(k+2)}$, ..., R$_{0(k+M)}$ generated by said position command generating means from a sampling time k+1 to a sampling time k+M which is M steps ahead of the sampling time k+1 are being used as variables,
where $X_{(k)}$: the status variable vector (n×1) of the system, Φ: the coefficient matrix (n×n) of the controlled object, G: the input matrix (n×m), $U_{(k)}$: the control input vector (m×i), $R_{0(k)}$: the enlarged position command signal (n×1), $F_M$: the final matrix (n×n), Q: the positive semi-definite symmetric matrix (n×n), $H_{(i)}$: the positive definite symmetric matrix (m×m), i=1, ..., M (M is a predictive period, i.e., the number of sampling times).

2. A position control system according to claim 1, wherein the matrix H representing a weight coefficient with respect to the control input vector $U_{(k)}$ is determined as a function of time, and a function which is of a value that is smaller as the sampling time goes more ahead is determined as:

$$H_{(i)} = H_0 + (H - H_0)e^{-Ci} (i=1, 2, \ldots, M)$$

where $H_0$, H, C are constants.

3. A position control system according to claim 2, wherein said controlled object comprises an injection molding machine including a mold assembly having a mold cavity, and resin injection means actuatable for injecting a synthetic resin material into said mold cavity in response to the control input value produced by said control means.

4. A position control system according to claim 1, wherein said controlled object comprises an injection molding machine including a mold assembly having a mold cavity, and resin injecting means actuatable for injecting a synthetic resin material into said mold cavity in response to the control input value produced by said control means.

* * * * *